Jan. 2, 1923.

E. W. ABRAM.
TEAPOT, COFFEEPOT, AND THE LIKE.
FILED MAR. 31, 1922.

1,440,947.

Inventor
Edmund W. Abram
by Heard Smith & Tennant.
Attys.

Patented Jan. 2, 1923.

1,440,947

UNITED STATES PATENT OFFICE.

EDMUND WILLIAM ABRAM, OF LONDON, ENGLAND.

TEAPOT, COFFEEPOT, AND THE LIKE.

Application filed March 31, 1922. Serial No. 548,382.

To all whom it may concern:

Be it known that I, EDMUND WILLIAM ABRAM, a British subject, residing at 3 Lansdowne Road, Holland Park, London, England, have invented certain new and useful Improvements in Teapots, Coffeepots, and the like, of which the following is a specification.

This invention has reference to improvements in tea pots, coffee pots and the like, and it consists mainly in the combination with a tea, coffee or like pot provided at its upper front part with a spout which has a clear throughway, of a removable shutter for retaining tea leaves or coffee or like grounds in the pot when an infusion prepared therein is being poured out, the said shutter being attached to the lid and extending obliquely downwards across the upper part of the pot from the lid to the front wall of the pot below the spout and having formed in it a horizontal slot through which the infusion must pass to the outlet, the liquid flowing over the horizontal edge of the slot as over a "weir". The invention comprises also constructional features hereinafter described and set forth specifically in the appended claims.

An embodiment of the invention is illustrated in the accompanying drawing, in which:—

Figure 1:
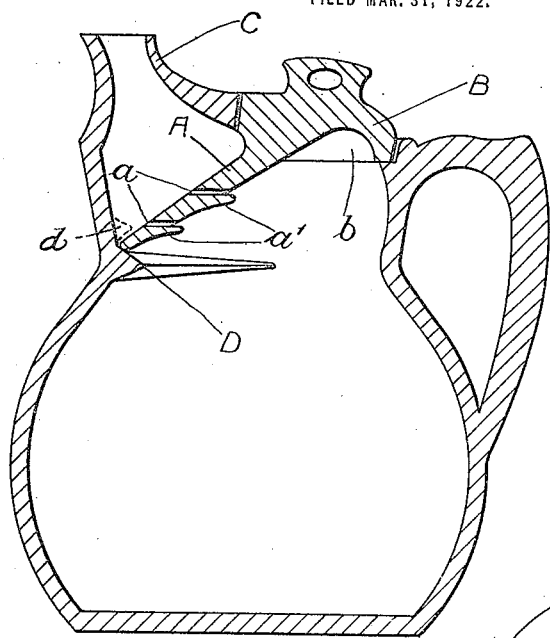
Fig. 1 is a sectional elevation of a tea pot provided with a removable shutter formed integrally with its lid.
Figure 3:
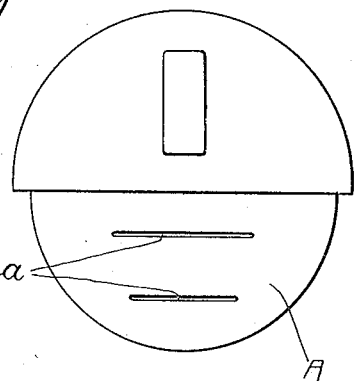
Fig. 3 is a plan view of the combined lid and shutter shown in section in Fig. 1.
Figure 2:
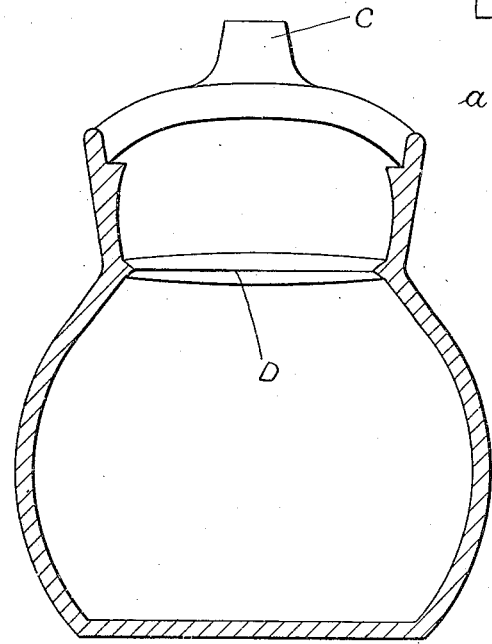
Fig. 2 is a section, at right angles to that shown in Fig. 1, of the same pot without its lid, looking from the rear.

Referring to the drawing, A is the slotted shutter which constitutes the outstanding characteristic feature of the invention, B is the lid, which in this particular construction is formed integrally with the said shutter, C is the upwardly projecting spout of the pot, and D is a ledge on which the lower margin or edge of the shutter rests and which serves also to retain the bulk of the tea leaves in the lower portion of the pot when the infusion is being poured out.

In the shutter A, slots $a$ are formed, through which the infusion passes in flowing to the spout, the said shutter being so shaped that its edge fits closely against the wall of the pot. Either or both edges of the slots $a$ may be formed with serrations or corrugations to assist in intercepting tea leaves or the like, and lips $a'$ extending along the lower edges of the said slots may be formed on the inner face of the shutter to deflect tea leaves away from the slots when the pot is tilted to pour out the infusion.

The lid B is preferably formed with a concavity as indicated at $b$ to enable it to retain the heat better, and a projection or ledge $d$ (shown in dotted lines in Fig. 1) may be formed on the wall of the pot a little above the ledge D so that the lower margin or edge of the shutter A may fit between the two ledges as in a groove or recess.

The spout C has a clear throughway so that the pot can be very readily cleaned; and, as the ledge D only extends partly around the pot, tea leaves, grounds or sediment can be easily washed out through the aperture which is normally closed by the lid.

The pot may be made of any suitable material.

I claim:—

1. The combination with a tea, coffee or like pot provided at its upper front part with a spout which has a clear throughway, of a removable shutter which is attached to the lid and extends obliquely downwards across the upper part of the pot from the lid to the front wall of the pot below the spout so that it shuts off that portion of the pot which is adjacent to the spout from the body portion, and in which a horizontal slot is formed so that an infusion prepared in the pot must flow through the slot, as over a weir, in passing to the spout.

2. In a tea, coffee or like pot provided at its upper part with a spout which has a clear throughway, means for retaining leaves or grounds in the pot when an infusion prepared therein is being poured out, consisting in combination of an inwardly projecting ledge formed on the wall of the pot some distance below the spout, a removable shutter which is adapted to be inserted through an aperture in the top of the pot and to shut off the portion of the pot which is above the said ledge and directly under the spout from the body portion in which the infusion is prepared, and a horizontal slot formed in the said shutter through which the infusion flows to the spout.

3. In a tea, coffee or like pot having a spout which projects upwards from the top of the pot and has a clear throughway, means for retaining leaves or grounds in the pot when an infusion prepared therein is being poured out, consisting in combination of an inwardly projecting ledge formed on the wall of the pot some distance below the spout, a removable shutter which is adapted to be inserted through an aperture in the top of the pot and to shut off that portion of the pot which is above the said ledge from the body portion in which the infusion is prepared, a horizontal slot formed in the said shutter, and an inwardly projecting lip formed on the said shutter and extending along the lower edge of the said slot.

EDMUND WILLIAM ABRAM.